United States Patent
Arora

(10) Patent No.: US 12,282,890 B2
(45) Date of Patent: Apr. 22, 2025

(54) SYSTEMS AND METHODS FOR PRODUCT ORDERING AND SECURELY DELIVERING ORDERED PRODUCTS

(71) Applicant: Walmart Apollo, LLC, Bentonville, AR (US)

(72) Inventor: Ishan Arora, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/203,303

(22) Filed: Mar. 16, 2021

(65) Prior Publication Data

US 2021/0287168 A1    Sep. 16, 2021

Related U.S. Application Data

(60) Provisional application No. 62/990,045, filed on Mar. 16, 2020.

(51) Int. Cl.
  *G06Q 10/0836* (2023.01)
  *G06Q 10/0832* (2023.01)
  (Continued)

(52) U.S. Cl.
  CPC ..... *G06Q 10/0836* (2013.01); *G06Q 10/0832* (2013.01); *G06Q 10/087* (2013.01); *G07C 9/00309* (2013.01)

(58) Field of Classification Search
  CPC ............. G06Q 10/0832; G06Q 10/087; G06Q 10/0836
  See application file for complete search history.

(56) References Cited

U.S. PATENT DOCUMENTS 6,967,575 B1    11/2005  Dohrmann
10,373,118 B1 *  8/2019  Lefkow .............. G06Q 10/0875
(Continued)

FOREIGN PATENT DOCUMENTS

WO    2002079947    10/2002
WO    2014001909     1/2014
(Continued)

OTHER PUBLICATIONS

Tobias, "Two Security Products That Deter Package Theft By Porch Pirates: Are They Really Worth It?", forbes.com, Mar. 13, 2020, Retrieved from https://www.forbes.com/sites/marcwebertobias/2020/03/13/two-security-products-that-deter-package-theft-by-porch-pirates-are-they-really-worth-it/ (Year: 2020).*

*Primary Examiner* — Rupangini Singh
*Assistant Examiner* — Bryan J Kirk
(74) *Attorney, Agent, or Firm* — Foley IP Law, PLLC

(57) ABSTRACT

In some embodiments, apparatuses and methods are provided herein useful for ordering and securely delivering products. In some embodiments, a system for ordering and securely delivering products comprises an inventory system associated with a retailer, a system controller, and a storage container. The storage container includes a housing that enclosing a product cavity, a locking door configured to enable access to the product cavity, a user interface coupled to the housing, a wireless communication device, and a container control circuit configured to receive, via the user interface, an electronic purchase order for products from the retailer, transmit to the inventory system the electronic purchase order, receive from the system controller a signal instructing the container control circuit to unlock the door, and perform an electronic unlocking function causing the door to unlock.

16 Claims, 6 Drawing Sheets

(51) Int. Cl.
*G06Q 10/087* (2023.01)
*G07C 9/00* (2020.01)

(56) References Cited

U.S. PATENT DOCUMENTS

| | | | |
|---|---|---|---|
| 10,997,548 B2* | 5/2021 | Nelson | G07C 9/00817 |
| 2015/0102903 A1 | 4/2015 | Wilkinson | |
| 2015/0178669 A1 | 6/2015 | Carr | |
| 2016/0224934 A1* | 8/2016 | Ramalingam | G06Q 10/0833 |
| 2016/0275450 A1 | 9/2016 | Chang | |
| 2018/0177319 A1 | 6/2018 | Willis | |
| 2018/0242768 A1* | 8/2018 | Lewis | G06Q 30/0645 |
| 2018/0260777 A1 | 9/2018 | Judge | |
| 2018/0352302 A1* | 12/2018 | Roe | H04N 21/42203 |
| 2019/0087771 A1* | 3/2019 | Westphal | H04W 4/80 |
| 2019/0251505 A1 | 8/2019 | Simms | |
| 2019/0362577 A1* | 11/2019 | Vigil | G07C 9/27 |
| 2020/0250915 A1* | 8/2020 | Schachte | A47G 29/141 |
| 2021/0061314 A1* | 3/2021 | Hara | H04L 67/12 |
| 2021/0298508 A1* | 9/2021 | Chowdhury | G07C 9/00571 |

FOREIGN PATENT DOCUMENTS

| | | |
|---|---|---|
| WO | 2015079203 | 6/2015 |
| WO | 2018029593 | 2/2018 |

* cited by examiner

SYSTEMS AND METHODS FOR PRODUCT ORDERING AND SECURELY DELIVERING ORDERED PRODUCTS

CROSS-REFERENCE TO RELATED APPLICATIONS

This application claims the benefit of U.S. Provisional Application No. 62/990,045, filed Mar. 16, 2020, which is incorporated herein by reference in its entirety.

TECHNICAL FIELD

This invention relates generally to ordering products from a retailer and securely delivering the ordered products to the customer.

BACKGROUND

Customers obtain retail products in many different ways. Increasingly, customers order retail products online from their personal computers or mobile devices. Oftentimes, the ordered retail products are delivered to the customer's residence, whereby the products are placed in a mailbox outside of the residence or placed outside by a door. In either case, the delivered products are generally left unsecured and are vulnerable to theft. Alternatively, a customer may schedule a delivery time so that they are present when the products are delivered. However, this option can be inconvenient for busy customers. Additionally, returning ordered products often involves printing out a return label and leaving the unsecured package in a place that is accessible to a delivery agent to retrieve the package, or the customer must travel to the post office or to a commercial delivery company to drop off the package to be returned. Thus, there is a need to improve a customer's ability to order products and to receive delivery of, and return, the ordered products in a secure manner.

BRIEF DESCRIPTION OF THE DRAWINGS

Disclosed herein are embodiments of systems, apparatuses and methods pertaining to ordering products from a retailer and receiving secure delivery of the ordered products. This description includes drawings, wherein.

Figure 1:
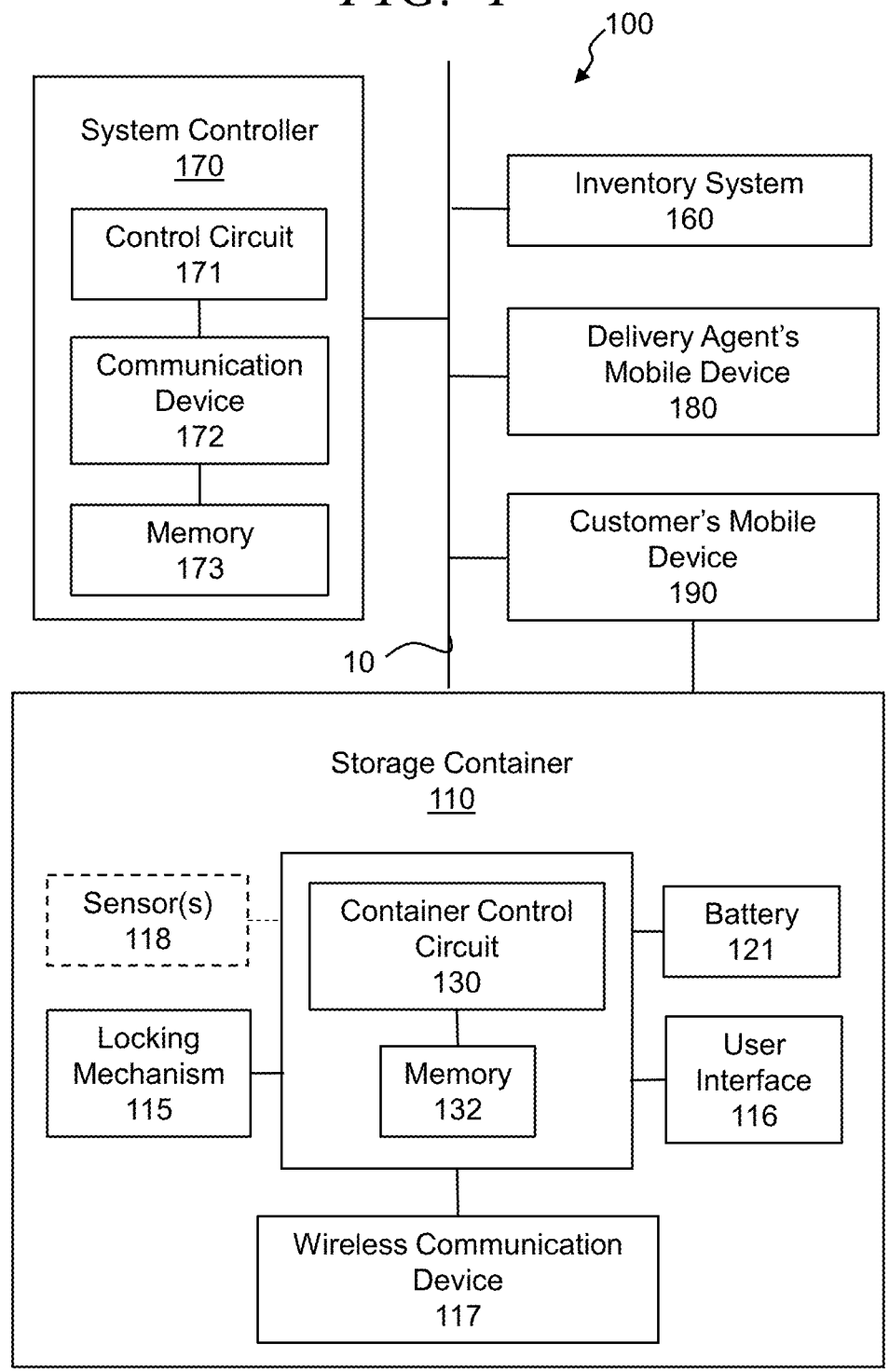
FIG. 1 is a block diagram of a system for product ordering and securely delivering ordered products in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for ordering products from a retailer and receiving secure delivery of the ordered products. A system for product ordering and securely delivering ordered products includes a portable storage container configured to be located outside of a delivery location, such as a residence. For example, the storage container may be placed on the front porch of a residence near the front door or any other location in which a delivery agent may access the storage container. The delivery agent may be, for example, a U.S. mail carrier, an agent of commercial delivery company (e.g., UPS, FedEx, etc.) a private courier, or the like.

The storage container comprises a housing, which encloses a product cavity, and a locking door configured to open to enable access to the product cavity. In some approaches, the product cavity may comprise two or more compartments configured to maintain different temperatures. A user interface is also coupled to the housing, which allows a customer to interact with the storage container and/or to place electronic orders from the retailer. In some approaches, the storage container may be associated with a particular retailer and may communicate with one or more systems of the retailer via a wireless communication device. In some embodiments, the storage container includes flexible strap configured to couple the storage container to a door of a residence. The storage container also includes an onboard power source, which may be a rechargeable power source, such as a rechargeable battery.

The storage container further includes a container control circuit communicatively coupled to a system controller and an inventory system via the wireless communication device. The container control circuit is configured to receive, via the container's user interface, an electronic purchase order for at least one product from the retailer. For example, a customer who wishes to place an online order for a product from the retailer can use the container's user interface to place the electronic order. The container control circuit then transmits the electronic purchase order to the inventory system, which processes the electronic order. Once the order is fulfilled, the inventory system and/or or one or more distribution systems, delivery systems, etc. associated with the retailer facilitates delivery of the order to a location specified by the customer. Rather than the delivery agent leaving the ordered products unsecured at the delivery location, as is commonplace, the system described herein enables secure delivery of the ordered products using the lockable storage container located outside of the delivery location.

In some approaches, prior to or upon arriving at the delivery location, the delivery agent requests an electronic authorization to unlock the storage container using an electronic device communicably coupled to the system controller. For example, the delivery agent may enter an order number or other code into their electronic device, which is transmitted to the system controller for authorization. If the system controller determines that the delivery agent is authorized to interact with the storage container, the system controller transmits to the container control circuit a signal instructing the container control circuit to unlock the storage container door. The container control circuit then performs an electronic unlocking function causing the storage container door to unlock, thereby allowing the delivery agent to place the products for delivery in the product cavity of the storage container. Upon placing the products in the product cavity, the delivery agent closes to the door of the storage container. In some approaches, the container control circuit is configured to cause the storage container door to automatically lock upon closing of the door following delivery.

Figure 2A:
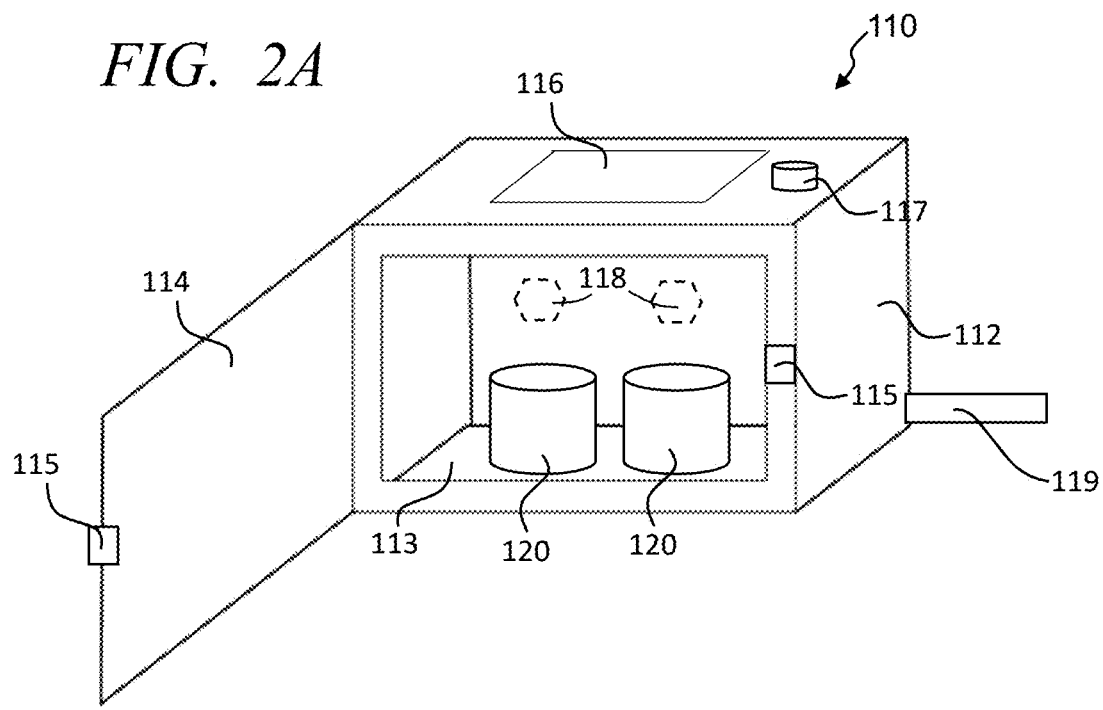
FIG. 2A is an illustration of an exemplary storage container in accordance with several embodiments.
Figure 2B:
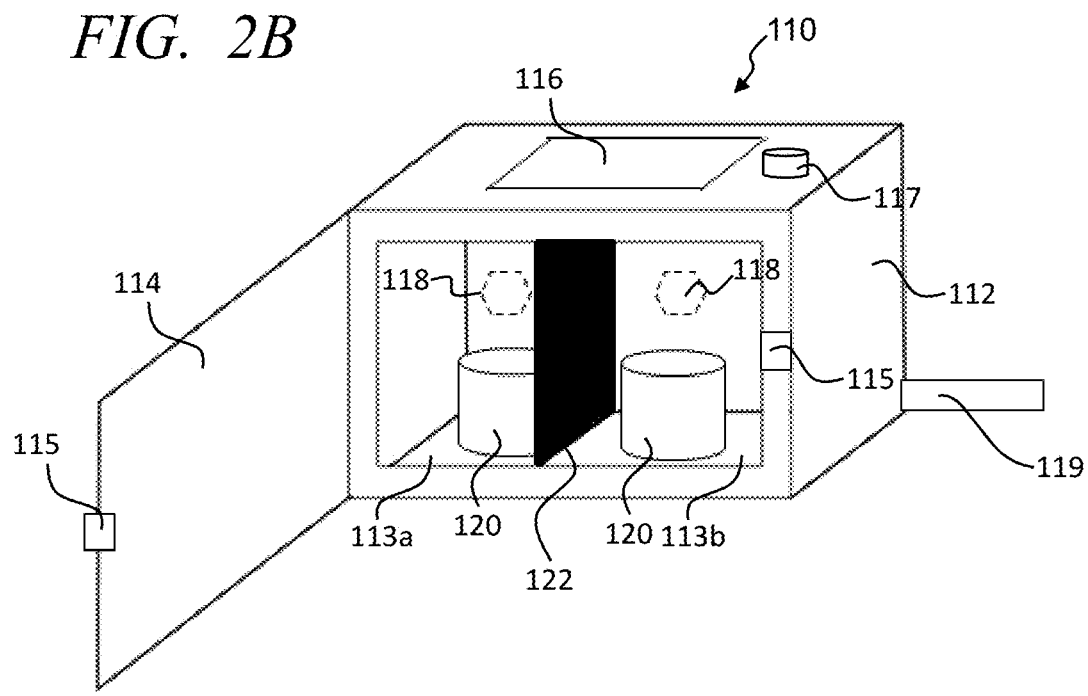
FIG. 2B is an illustration of an exemplary storage container having multiple compartments in accordance with some embodiments.
Figure 3:
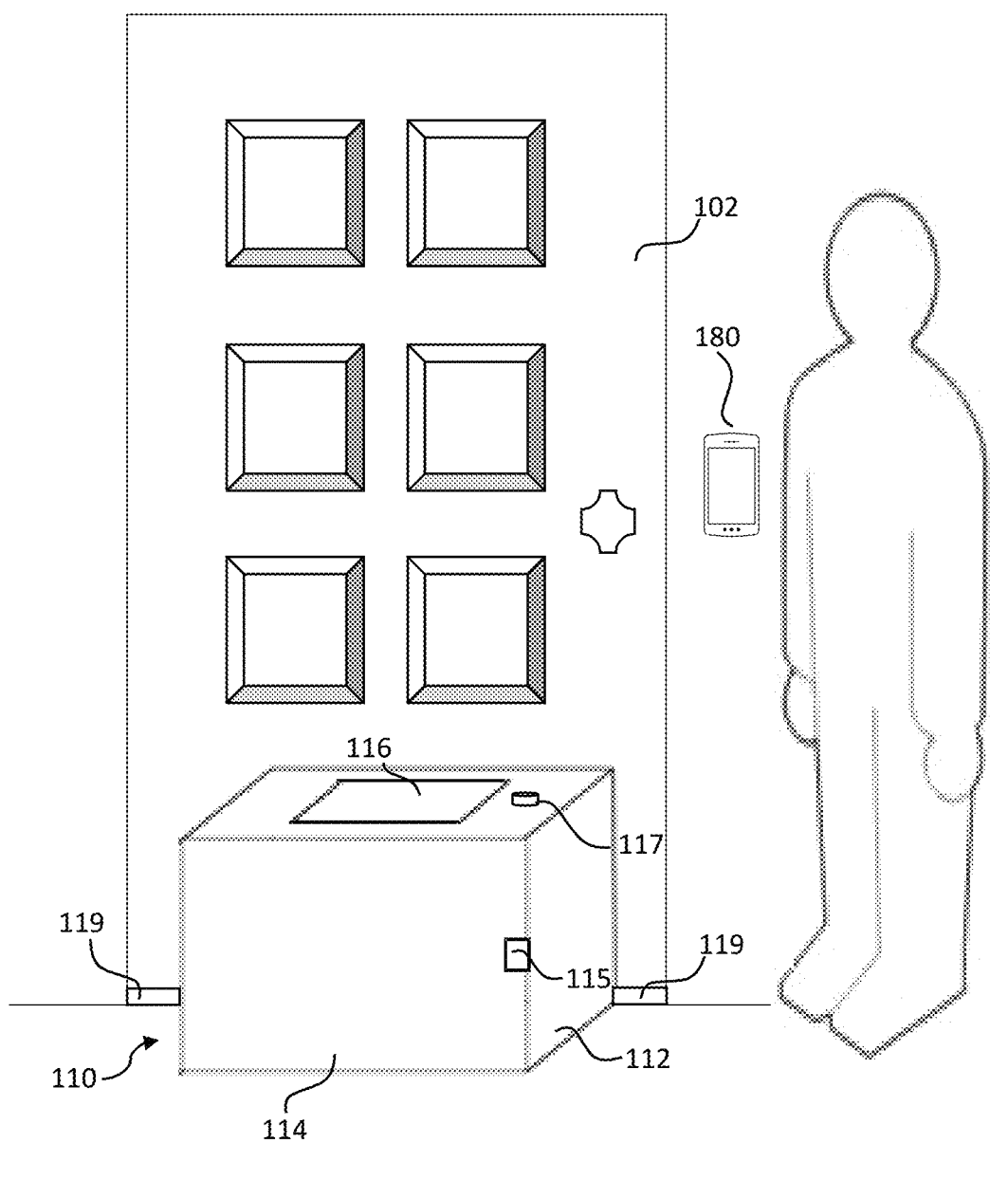
FIG. 3 is an illustration of an exemplary locked storage container in a secured state in accordance with some embodiments.
Figure 4:
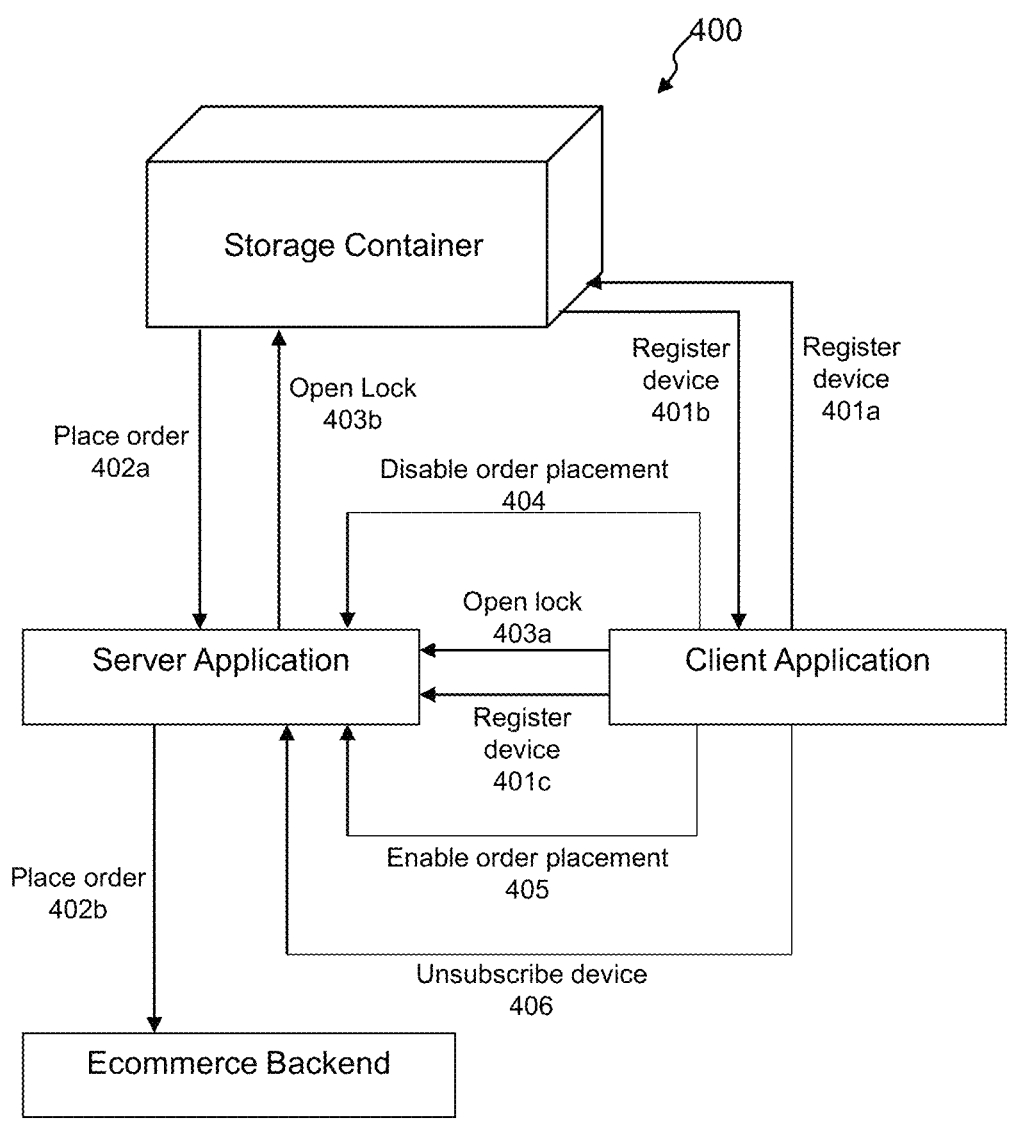
FIG. 4 is a block diagram of a system and method for product ordering and securely delivering ordered products in accordance with several embodiments.
Figure 5:
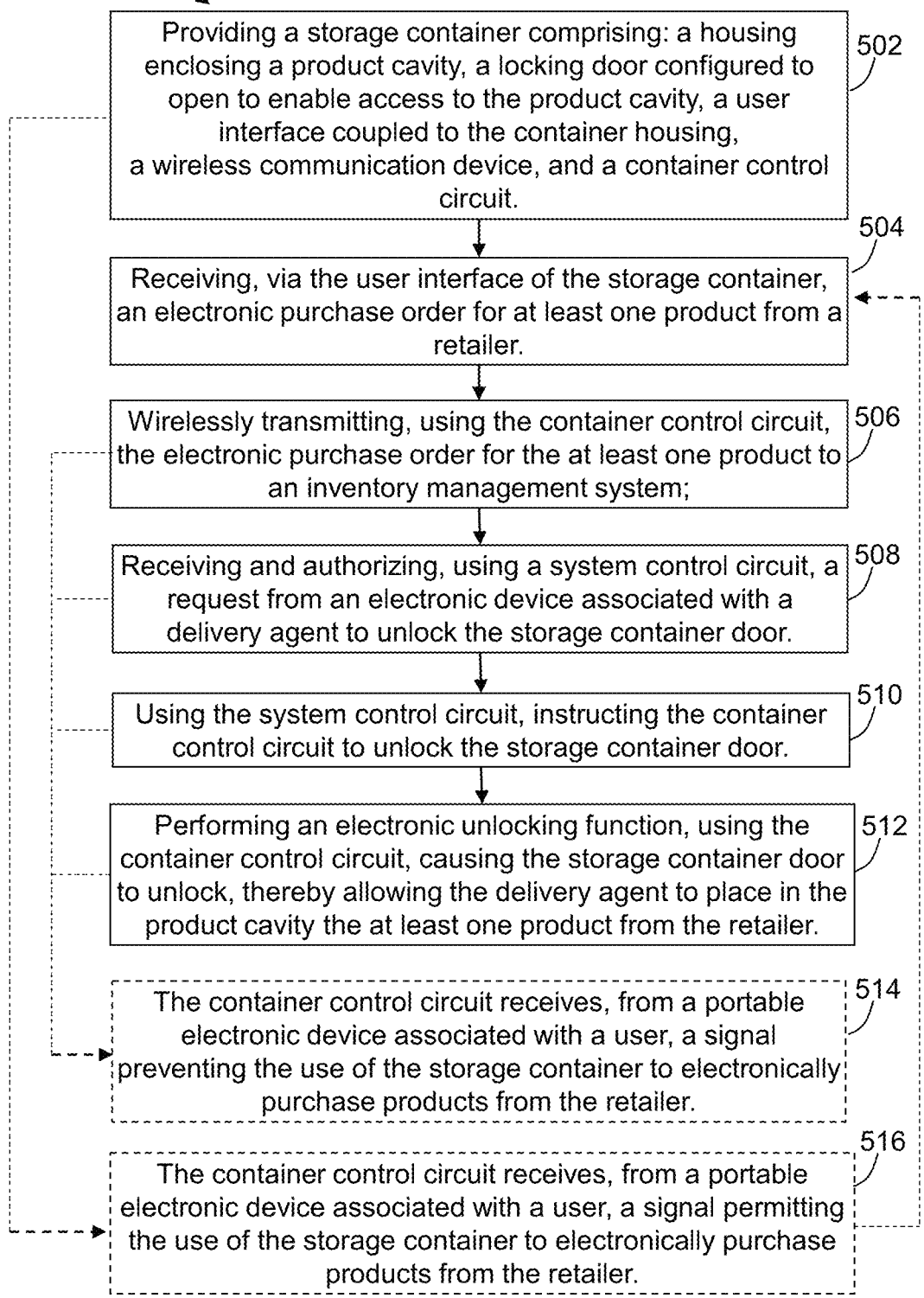
FIG. 5 is a flow diagram of a method for product ordering and securely delivering ordered products in accordance with several embodiments.
Figure 6:
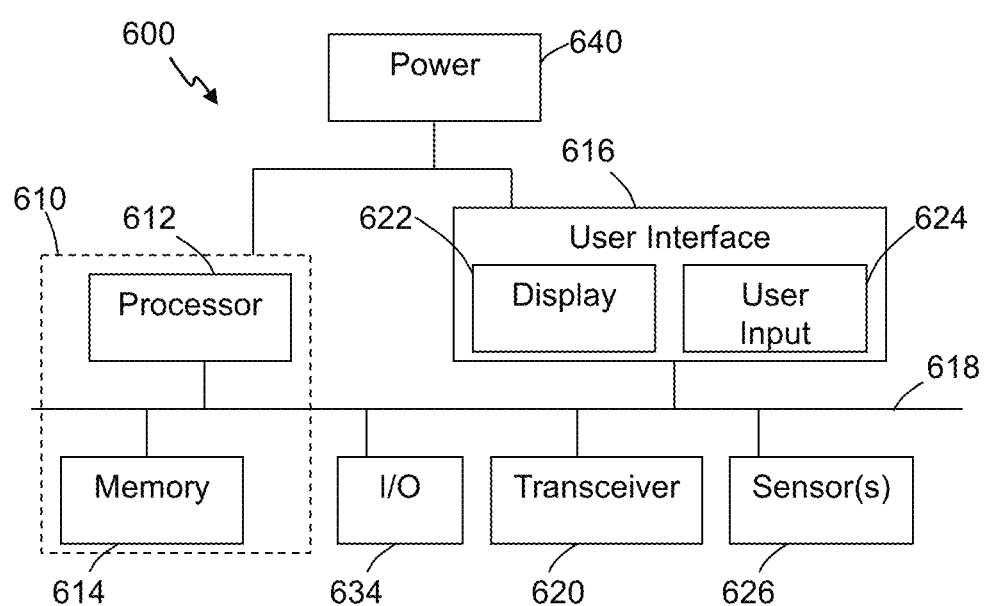
FIG. 6 is a block diagram of an exemplary system for use in implementing methods, techniques, devices, apparatuses, systems, servers, and sources for product ordering and securely delivering ordered products in accordance with several embodiments.

FIG. 1 is a block diagram of a system 100 for product ordering and securely delivering ordered products. FIGS. 2A and 2B are illustrations of exemplary storage containers 110 useful in system 100. FIG. 3 is an illustration of an exemplary storage container 110 in a locked and secured state. FIG. 4 is a block diagram of a system 400 and method for product ordering and securely delivering ordered products. FIG. 5 is a flow diagram of a method 500 for product ordering and securely delivering ordered products. FIG. 6 is a block diagram of an exemplary system 600 for use in implementing methods, techniques, devices, apparatuses, systems, servers, and sources for product ordering and securely delivering ordered products in accordance with several embodiments.

Referring to FIGS. 1-3, exemplary systems, and components thereof, for product ordering and securely delivering ordered products are shown. The system 100 includes a storage container 110 configured to securely receive and store one or more delivered products. The storage container 110 includes a housing 112 enclosing a product cavity 113. The storage container 110 also includes a locking door 114 configured to open to enable access to the product cavity 113. The storage container 110 may be powered by an onboard power source, such as, for example, an onboard battery 121, which may be rechargeable.

By one approach (and as shown in the illustrative examples presented in FIG. 2A) the locking door 114 is pivotally secured to a front (or side or top) panel of the storage container 110 and is of sufficient size to cover an opening through that panel that is itself of sufficient size to permit ready access to the product cavity 113 to thereby facilitate the placement of the ordered and delivered products 120 therein and the subsequent removal of such products 120 by the customer upon delivery.

The storage container 110 also includes a locking mechanism 115 having cooperating elements on the locking door 114 and the storage container 110 configured to enable the door of the storage container to securely lock. The locking mechanism 115 permits the door to be selectively locked and unlocked by, for example, a container control circuit 130 to which the locking mechanism 115 is operably coupled or to which the locking mechanism 115 is otherwise remotely responsive. A variety of known locking mechanisms are known in the art that will suffice in these regards including, for example, locking mechanisms that employ an electrically-controlled latch.

The storage container 110 can assume any of a wide variety of form factors including any of a variety of differently-proportioned and differently-sized rectangles. By way of example and without intending any limitations in these regards, FIGS. 2A, 2B, and 3 illustrate a storage container 110 having a rectangular shape. Similarly, the storage container 110 can be comprised of any of a variety of materials include various metals, impact-resistant plastics, and so forth. The particular shape, size, and material employed in a given application can vary depending upon the needs and requirements of that application setting. As one simple and non-limiting example, the storage container 110 may comprise a rectangle having an interior space of between, for example, 1 to 10 cubic feet. In some approaches, the storage container can have a size and configuration such that it is portable and can be carried by a person. The product cavity 113 can similarly have any of a variety of sizes and shapes as desired.

The storage container described herein is intended to be a secure delivery receptable, which is resistant to theft. Thus, the storage container 110 may include one or more fasteners for securing the storage container to the delivery location. For example, in a non-limiting example illustrated in FIGS. 2A, 2B, and 3, the container may include a flexible strap 119 that removably secures the container to the door 102 of a customer's residence, thereby preventing an unauthorized person from removing the storage container (and its contents) from the delivery location. The flexible strap 119 may include any suitable materials and components to securely fasten the storage container to the door. In some approaches, the flexible strap may be formed of a suitable a cut-resistant material. In some approaches, the customer may elect to keep the storage container outside continuously. In such a scenario, the storage container may be permanently mounted to the delivery location. For example, the storage container may be bolted to the front porch or an outer wall of the residence.

In some approaches, the product cavity 113 of storage container may be separated into multiple compartments. In one example, as shown in FIG. 2B, the product cavity may be divided into two distinct compartments (see 113a and 113b) by a divider 122. In some approaches, the storage container 110 may include one or more temperature sensors 118. Such a temperature sensor 118 could be located, for example, inside the product cavity or one or more compartments thereof and can be operably coupled to the container control circuit 130. So configured, the container control circuit 130 can determine when the interior temperature of the product cavity or one or more compartments thereof is too hot (or cold) for a delivered product contained therein and automatically respond, for example, by transmitting a corresponding alert (via, for example, a wireless communication device 117). In another approach, the storage container 110 may include a climate control system configured to maintain an appropriate interior temperature. For example, the climate control system may include one or more fans, heating elements, and/or chillers configured to increase and/or decrease a temperature of the product cavity or one or more of the compartments therein. The container control circuit 130 may cooperate with the climate control system to maintain a suitable temperature in the product cavity or one or more of the compartments therein. For example, suitable temperatures may include ambient temperature, refrigerated temperature, deep fridge temperature, and the like. In some approaches, the suitable temperature(s) may be selected or otherwise programmed by the customer. In other approaches, the suitable temperature(s) may be transmitted by the system controller 170 and received by the container control circuit 130 based on the particular products ordered. In some approaches, the container control circuit 130 may be configured to maintain different temperatures in each of the multiple compartments of the product cavity.

The aforementioned container control circuit 130 can comprise a fixed-purpose hard-wired platform or can comprise a partially or wholly programmable platform. These architectural options are well known and understood in the art and require no further description here. This container control circuit 130 is configured (for example, by using corresponding programming as will be well understood by those skilled in the art) to carry out one or more of the steps, actions, and/or functions described herein.

By one approach the container control circuit 130 operably couples to a computer readable storage memory 132. This memory 132 may be integral to the container control circuit 130 or can be physically discrete (in whole or in part) from the container control circuit 130 as desired. This memory 132 can also be local with respect to the container control circuit 130 (where, for example, both share a common circuit board, chassis, power supply, and/or housing) or can be partially or wholly remote with respect to the container control circuit 130. The container control circuit 130 may comprise a processor, a microprocessor, and the like and may be configured to execute computer readable instructions stored on the computer readable storage memory 132. The computer readable storage memory 132 may comprise volatile and/or nonvolatile memory and have stored upon it, a set of computer readable instructions which, when executed by the container control circuit 130, causes the storage container to, for example, receive and transmit purchase orders from a customer and receive and execute instructions to unlock the storage door. For instance, the container control circuit 130 may receive, via a user interface 116 coupled to the storage container 110, an electronic purchase order for at least one product from the retailer; transmit via network 10 the electronic purchase order to an inventory system 160 and/or the system controller 170 communicatively coupled to the container control circuit 130; receive from the system controller 170 a signal requesting the unlocking of the storage container's door; and cause the locking mechanism 115 to unlock the door 114 of the storage container. The container control circuit 130 can also facilitate direct communication between the storage container 110 and a customer's mobile electronic device 190, for example when a customer pairs their mobile electronic device with the storage container 110 to register the storage container and to enable and disable the ordering capabilities of the storage container. The container control circuit 130 may also cause the storage container's door to automatically lock upon closing of the door following delivery. In addition, the container control circuit 130 may receive signals from the one or more temperature sensors 118 in the product cavity of the storage container 110 and may cooperate with the climate control system to maintain a particular temperature in the product cavity. In some embodiments, the computer executable instructions may cause the container control circuit 130 to perform one or more steps in the methods and processes described herein with reference to FIGS. 4 and 5.

The container control circuit 130 may also receive signals from one or more sensors and/or cameras operably coupled to the container control circuit 130 and configured to detect a presence of, or otherwise identify, a particular product and determine a level or amount of the product in the product cavity. The sensors can include substantially any relevant sensor, including, for example, weight sensors, volume sensors, optical sensors, and other such sensors. In some scenarios, a customer may store their ordered consumable products in the storage container inside their house. When the container control circuit 130 receives a signal from the sensor(s) and/or camera(s) indicating that a particular product is below a first predetermined count threshold, the container control circuit 130 is configured to automatically re-purchase an amount of the product. For example, the container control circuit can transmit a purchase order to the inventory system 160 and/or the system controller 170 to purchase an amount of the particular product to bring the container inventory level of the product up to a second predetermined count threshold, which is higher than the first predetermined count threshold.

The storage container 110 further includes a wireless communication device 117, which operably couples to the container control circuit 130 and is configured to enable communications with one or more separate and geographically remote components (such as, for example, the inventory system 160, the system controller 170, delivery services, shipping entities, mobile electronic devices, and so forth). In some embodiments, the wireless communication device 117 may comprise a network adapter, a modem, a router, a wireless transceiver, a mobile network transceiver, or the like. Any of a variety of short-range, medium-range, and long-range wireless communication devices, applications, protocols, etc. may be suitable. As so configured, the storage container 110 is communicatively couplable to one or more separate and geographically remote components via the network 10, which may comprise, for example, the Internet, a private network, a secure network, a mobile network, a cellular network, and/or the like.

The system further includes an inventory system 160. The inventory system 160 may comprise one or more systems and/or components needed to remotely execute a purchase order. For example, the inventory system may include one more control circuits, processor-based devices, memories, communication devices, servers, product databases, inventory databases, customer databases, delivery databases, and the like.

In some approaches, the system may include a separate system controller 170, which is communicatively coupled to the container control circuit 130, the inventory system 160, and/or various components coupled thereto. The system controller 170 may comprise a control circuit 171, a memory 173, and a communication device 172. The system controller 170 may comprise one or more of a server, a central computing system, and the like. In some embodiments, the system controller 170 may comprise a system of two or more processor-based devices. The control circuit 171 may comprise a processor, a microprocessor, and the like and may be configured to execute computer readable instructions stored on a computer readable storage memory 173. The communication device 172 of the system controller 170 may comprise a network interface configured to communicate with one or more of the components of the system 100 via a network 10 such as the Internet, a private network, a secure network, a mobile network, and the like. In some embodiments, the communication device 172 may comprise a network adapter, a modem, a router, a wireless transceiver, a mobile network transceiver, and the like.

The computer readable storage memory 173 may comprise volatile and/or nonvolatile memory and have stored upon it, a set of computer readable instructions which, when executed by the control circuit 171, causes the system controller 170 to receive from the container control circuit 130 an electronic purchase order for at least one product from the retailer and transmit the purchase order to the inventory system 160; transmit to the inventory system 160 the electronic purchase order; cause the inventory system 160 to execute or otherwise fulfill the purchase order; facilitate delivery of the purchase order; receive and authorize a request from the delivery agent's electronic device 180 to unlock the storage container door 114; and instruct the container control circuit 130 to perform an electronic unlocking function by communicating with the locking mechanism 115, causing the locking mechanism 115 to storage container door 114 to unlock, and thereby allowing the delivery agent to place the ordered products 120 in the product cavity 113. The control circuit 171 can also facilitate enabling and disabling the ordering capabilities of the storage container and may cooperate with components of the storage container 110 to maintain suitable temperatures and/or container inventory levels. In some embodiments, the computer executable instructions may cause the control circuit 171 to perform one or more steps in the methods and processes described herein with reference to FIGS. 4 and 5.

The storage container 110 also includes a user interface 116 operably coupled to the container control circuit 130. The user interface 116 may comprise one or more user input/output devices configured to allow customers to place purchase orders from the storage container 110 itself and/or to otherwise electronically interact with the storage container or components thereof. In some approaches, the user interface 116 may comprise one or more of a touchscreen, a see-through touch screen, a keypad, one or more buttons, a display screen, a microphone, a speaker, and the like. In some embodiments, the user interface 116 may be configured to display images and/or an ordering menu. While FIGS. 2A, 2B, and 3 illustrate the user interface 116 positioned on a top portion of housing 112 of the storage container 110, the user interface 116 may be positioned in or on any suitable portion of the storage container, so long as the customer can access the user interface as needed.

In some approaches, the storage container 110 may be communicatively couplable to a customer's mobile device 190. In one example, the customer's mobile device 190 may include a smart phone, a laptop, a cell phone, a computer, and/or any devices that may be used by a customer to connect directly to the storage container 110 and/or via the network 10. The customer's mobile device 190 will include a client application (e.g., a mobile app) associated with the retailer, which allows the customer to interact with components of the retailer's ecommerce system including, for example, the system controller 170, the inventory system 160, and/or one or more associated databases. So configured, the customer may access product lists, databases, account information, and may execute purchase orders from their mobile device. The client application also allows the customer to electronically interact with the storage container itself and/or one or more of its components. For example, the customer may interact with the storage container to register the container and to enable/disable the container's ordering capabilities.

The delivery agent is also equipped with mobile device 180 that includes the client application associated with the retailer. The client application enables the delivery agent's mobile device 180 to communicate with the system controller 170. The delivery agent's mobile device 180 may include a smart phone, a laptop, a cell phone, a computer, and/or any devices that may be used by the delivery agent during delivery to communicate with the system controller to request unlocking of the storage container. The delivery agent may be, for example, a U.S. mail carrier, an agent of commercial delivery company (e.g., UPS, FedEx, etc.) a private courier, or the like.

A discussed herein, the customer may use the user interface 116 and/or the client application installed on their mobile device 190 to perform one or more steps for ordering products from the retailer. For example, prior to placing an order, the customer may use the client application installed on their mobile device 190 to electronically register the storage container. With reference to FIG. 4, the device registration process begins with the customer using the client application on their mobile device to scan for nearby storage containers. The customer then electronically selects their particular storage container from a list of detected devices. The storage container may comprise storage container 110 described herein with reference to FIGS. 1-3.

In step 401a, the client application on the customer's mobile device pairs the mobile device with the storage container using a Wi-Fi connection to which the mobile device is connected. In step 401b, the storage container sends to the mobile device's client application details about the storage container, such as, but not limited to, the device type, device identification, etc.). In step 401c, the client application requests the customer to authenticate and authorize the storage container to place an order (i.e., to communicate with the retailer's ecommerce backend system). The ecommerce backend system may include, for example, one or more components of inventory system 160 and/or system controller 170 described herein with reference to FIGS. 1-3. In response to the client application's request for authorization, the system sends back the authorization details to the client application. At this point, the storage container's device identification, device type, and authorization details may be stored in one or more databases associated with the server application. The server application may include, for example, one or more components of inventory system 160 and/or system controller 170.

Once the storage container is registered or otherwise authenticated, the customer may use the user interface on the storage container to place an electronic order. For example, the customer may use the user interface to electronically enter product number(s) and quantities of products they want to purchase. The customer then confirms the purchase request, which prompts the storage container, in step 402a, to send the purchase request to the server application. In step 402b, the purchase request is forwarded to the retailer's ecommerce backend system, which fulfills the purchase order. In some approaches, the customer may receive a notification when the order is placed, for example, via the storage container's user interface, the customer's mobile device, via email, etc.

When the customer first begins using the storage container to place orders, the customer may not know the product numbers of the products they wish to order. Thus, in some approaches, the customer may begin by opening the retailer's client application on their mobile device and navigating to a product page that lists various products and their product numbers. In some approaches, the product page may display a list of the most popular products purchased using the client application. For example, the product page may list the top 100 most popular products purchased within a given period. In another example, the product page may list the most popular products in particular product categories (e.g., personal care products, food products, etc.), regions, etc. In some approaches, the product page may list the most popular/and or recent products purchased by the customer.

The product list displays each product with their associated product number. In some approaches, the product number may be a simple number or series of digits assigned to the product. For example, a particular brand of toothpaste may be assigned the product number "1", while a particular band of soap may be assigned the product number "10." The customer then enters the product number(s) and quantities of the products they want to purchase via the user interface of the storage container. It will be understood that over time, the customer will begin to remember the simple product numbers of the products they order most frequently and, as such, the need to consult the product list prior to placing orders will diminish. Instead, the customer can simply enter the product numbers from memory and quickly place the order. In some approaches, the container control circuit may be configured to use machine learning to predict items for purchase and to display the predicted items via the user interface.

In some approaches, the customer may elect to order the products using the client application on their mobile device. In such a scenario, the client application communicates the purchase request to the ecommerce backend system (in some approaches, via the server application), and the ecommerce backend system fulfills the purchase order.

Once the order is processed or otherwise fulfilled by the retailer's ecommerce backend system, the backend system and/or or one or more distribution systems, delivery systems, etc. associated with the retailer facilitates delivery of the order to a location specified by the customer. In some approaches, the customer may electronically provide the delivery location using the client application on their mobile device, using the retailer's ecommerce website, or even via the user interface on the storage container. The customer's delivery location is then stored by the server application for future use and may be selected and/or deselected by the customer when placing an order. In other approaches, the delivery location may be identified based on details associated with the storage container and provided to the server application when an order is placed. For example, when the customer places an order, the storage container may attach a message to the order providing location information of the storage container. In some approaches, the customer may register the storage container with the retailer and may specify a physical address where the storage container is located.

As discussed herein, the system enables secure delivery of the ordered products using the storage container located outside of the delivery location. After placing the order, if the storage container is not already in a suitable location to accept the delivery (e.g., outside of the customer's residence), the customer places the storage container in a suitable location to accept the delivery from a delivery agent. For example, the customer may place the storage container on the front porch of their residence, as illustrated in FIG. 3. As discussed above, the storage container may include one or more fasteners for securing the container to the storage location.

When the delivery agent arrives at the delivery location to deliver the ordered products, the delivery agent opens the client application on their mobile device and enters a unique identifier to request that the storage container be unlocked. In some approaches, the unique identifier may be an order identification number. The client application sends the request with the unique identifier to the server application in step 403*a*. The server application then authorizes the unlocking request using the unique identifier provided by the delivery agent. For example, the system may query a database of authorized identifiers (e.g., recent purchase orders) for a match with the identifier provided by the delivery agent. If the server application authorizes or otherwise approves the unlocking request, the server application will send a request to unlock the door of the storage container, in step 403*b*. The storage container then executes the request and unlocks the door of the container, allowing the delivery agent to place to ordered products into the storage container. Ideally, the delivery agent will close the door of the storage container once the delivery is complete. In some approaches, locking mechanism of the storage container is configured to automatically lock upon closing of the door following delivery. In some approaches, the storage container may provide an alert or instruction to the delivery agent to close the door.

In some approaches, the system may provide an indication to the customer that the delivery has been successfully completed. For example, the customer may receive a notification on their mobile device, via email, etc. In another approach, the storage container may be configured to provide an indication that the delivery has been successfully completed. For example, the container may display a message on the user interface, a color or light indication, etc.

In some approaches, the customer may elect to disable order placement capabilities from the storage container (e.g., on the day of delivery), as shown in step 404 of FIG. 4. For example, the customer opens the client application on their mobile device and selects the option to disable the storage container's ordering capabilities. The client application communicates this status change request to the server application, and the server application changes the status to disable the storage container's ordering capabilities, thereby preventing the storage container from communicating with the ecommerce backend system to place purchase orders.

In some approaches, the customer can enable or re-enable the storage container's ordering capabilities (e.g., after the order has been delivered or prior to first or subsequent order placement), as shown in step 405 of FIG. 4. For example, the customer opens the client application on their mobile device and selects the option to enable the storage container's ordering capabilities. The client application communicates this status change request to the server application, and the server application changes the status to enable the storage container's ordering capabilities, thereby permitting the storage container to communicate with the ecommerce backend system to place purchase orders.

In step 406, the customer can unsubscribe the storage container using the client application on the customer's mobile device.

In some approaches, the storage container 110 described herein may be used to return unwanted items purchased from the retailer. In this scenario, the customer may facilitate an electronic return transaction using the client application on their mobile device 190, or by using the user interface 116 associated with the storage container 110. In either case, the return request is transmitted to the ecommerce backend system (e.g., to the inventory system 160 and/or the system controller 170) and the ecommerce backend system processes the return request. In some approaches, processing the return request may include assigning to the return transaction a unique identifier. The ecommerce backend system may then coordinate with more distribution systems, delivery systems, etc. associated with the retailer to facilitate a return pickup at the original delivery location by a delivery agent.

After the return transaction has been authorized by the ecommerce backend system, if the storage container is not already in a suitable location accessible to a delivery assigned to pick up the product for return, the customer places the storage container in a suitably accessible location. When the delivery agent arrives at the pickup/delivery location to pick up the products to be returned, the agent opens the client application on their mobile device and enters the unique return transaction identifier to request that the storage container be unlocked. The client application sends the request with the unique return transaction identifier to the server application (similar to step 403a in FIG. 4). The server application then authorizes the unlocking request using the unique return transaction identifier provided by the delivery agent. For example, the system may query a database of authorized identifiers (e.g., associated with recent return transactions) for a match with the identifier provided by the delivery agent. If the server application authorizes or otherwise approves the unlocking request, the server application will send to the storage container instructions to unlock the locked door (similar to step 403b in FIG. 4). The storage container then executes the request and unlocks the door of the container, allowing the delivery agent to remove the products from the storage container.

In some approaches, the system may provide an indication to the customer that the return pickup has been successfully completed. For example, the customer may receive a notification on their mobile device, via email, etc. In another approach, the storage container may be configured to provide an indication that the return pickup has been successfully completed. For example, the container may display a message on the user interface, a color or light indication, etc.

FIG. 5 is a flow diagram of a method 500 for product ordering and securely delivering ordered products. The method 500 may be implemented using the system 100 for product ordering and securely delivering ordered products described herein with reference to FIGS. 1-3.

In step 502, a storage container is provided, the storage container comprising a housing enclosing a product cavity and a locking door configured to open to enable access to the product cavity. In some approaches, the storage container includes a locking mechanism having cooperating elements on the locking door and the storage container configured to enable the door of the storage container to securely lock. The locking mechanism permits the door to be selectively locked and unlocked by, for example, container control circuit to which the locking mechanism is operably coupled or to which the locking mechanism is otherwise remotely responsive. A variety of known locking mechanisms are known in the art that will suffice in these regards including, for example, locking mechanisms that employ an electrically-controlled latch. The storage container further comprises a user interface coupled to the housing and operably coupled to the container control circuit. A wireless communication device is also operably coupled to the container control circuit. The storage container may also include a rechargeable on-board power source. In some approaches, the storage container may further include a flexible strap configured to couple the storage container to a door of a residence. In some approaches, the storage container may comprise storage container 110 described herein with reference to FIGS. 1-3.

In step 504, the storage container receives, via the user interface of the storage container, an electronic purchase order for at least one product from a retailer. For example, the customer may use the user interface to electronically enter product number(s) and quantities of products they want to purchase. The customer then confirms the electronic purchase order. In some scenarios, prior to placing an order, the customer may use the client application installed on their mobile device to electronically register the storage container, as described herein with reference to FIG. 4 (see steps 401a to 401c).

As described above, when the customer first begins using the storage container to place orders, the customer may not know the product numbers of the products they wish to order. Thus, in some approaches, the customer may begin by opening the retailer's client application on their mobile device and navigating to a product page that lists various products and their product numbers. In some approaches, the product page may display a list of the most popular products purchased using the client application. For example, the product page may list the top 100 most popular products purchased within a given time frame. In another example, the product page may list the most popular products in particular product categories (e.g., personal care products, food products, etc.) In some approaches, the product page may list the most popular/and or recent products purchased by the customer.

The product list displays each product with their associated product number. In some approaches, the product number may be a simple number or series of digits assigned to the product. For example, a particular brand of toothpaste may be assigned the product number "1", while a particular band of soap may be assigned the product number "10." The customer then enters the product number(s) and quantities of the products they want to purchase via the user interface of the storage container. It will be understood that over time, the customer will begin to remember the simple product numbers of the products they order most frequently and, as such, the need to consult the product list prior to placing orders will diminish. Instead, the customer can simply enter the product numbers from memory and quickly place the order. In some approaches, the container control circuit may be configured to use machine learning to predict items for purchase and to display the predicted items via the user interface.

In step 506, the storage container wirelessly transmits, using the container control circuit, the electronic purchase order for the at least one product to an inventory system. In some approaches, the inventory system may comprise inventory system 160 described herein with reference to FIGS. 1-3. In some approaches, the customer may receive a notification when the order is placed, for example, via the storage container's user interface, the customer's mobile device, via email, etc.

Once the order is processed or otherwise fulfilled by the inventory system, the inventory system, a system controller, and/or or one or more distribution systems, delivery systems, etc. associated with the retailer facilitates delivery of the order to a location specified by the customer. In some approaches, the customer may electronically provide the delivery location using the client application on their mobile device, using the retailer's ecommerce website, or even via the user interface on the storage container. The customer's delivery location is then stored for future use and may be selected and/or deselected by the customer when placing an order. In other approaches, the delivery location may be identified based on details associated with the storage container and transmitted by the storage container when the container transmits the purchase order. For example, when the customer places an order, the storage container may attach a message to the order providing location information for the storage container. In some approaches, the customer may register the storage container with the retailer and may specify a physical address where the storage container is located.

In step 508, the system controller receives and authorizes a request from an electronic device associated with a delivery agent to unlock the storage container door. In some approaches, the system controller may comprise system controller 170 described herein with reference to FIGS. 1-3. For example, when the delivery agent arrives at the delivery location to deliver the ordered products, the agent opens the client application on their mobile device and enters a unique identifier to request that the storage container be unlocked. In some approaches, the unique identifier may be an order identification number. The client application sends the request with the unique identifier to the system controller, which authorizes the unlocking request using the unique identifier provided by the delivery agent.

In step 510, the system controller communicates with the container control circuit and instructs the container control circuit to perform an unlocking function to unlock the door of the storage container. In some approaches, the container control circuit communicates with the locking mechanism to facilitate the unlocking function.

In step 512, in response to the instruction received from the system controller, the container control circuit performs the electronic unlocking function, for example, by communicating with the locking mechanism and causing the locking mechanism to unlock, thereby allowing the delivery agent to place in the product cavity the at least one product from the retailer. In some approaches, the storage container may provide an alert or instruction to the delivery agent to close the door. In some approaches, the container control circuit is configured to cause the storage container door to automatically lock upon closing of the door following delivery.

In some scenarios, the storage container may not be enabled to facilitate purchase transactions. For example, the storage container may be new and the storage container's ordering capabilities may not yet have been enabled. In another example, the customer may have elected to disable the container's storage capabilities following a previous order/delivery. Thus, in some approaches, prior to placing an order using the storage container, the customer may use the client application installed on their mobile device to electronically enable the storage container's ordering capabilities, as described herein with reference to FIG. 4 (see step 405). For example, in some approaches, prior to transmitting the electronic purchase order to the inventory system, the container control circuit receives, from a portable electronic device associated with a customer, a signal permitting the use of the storage container to electronically purchase products from the retailer, in optional step 514.

In some scenarios, the customer may elect to disable order placement capabilities from the storage container (e.g., on the day of delivery), as described herein with reference to FIG. 4 (see step 404). For example, in some approaches, after transmitting the electronic purchase order to the inventory system, the container control circuit receives, from the portable electronic device associated with the customer, a signal preventing the use of the storage container to electronically purchase products from the retailer, in optional step 516.

In some approaches, the product cavity of the storage container may be separated into multiple compartments. In one example, as shown in FIG. 2B, the product cavity may be divided into two distinct compartments. In some approaches, the storage container may include one or more temperature sensors operably coupled to the container control circuit and may be located, for example, inside the product cavity or one or more compartments thereof. So configured, the container control circuit can determine when the interior temperature of the product cavity or one or more compartments thereof is too hot (or cold) for a delivered product contained therein and automatically respond, for example, by transmitting a corresponding alert. In another approach, the storage container may include a climate control system configured to maintain an appropriate interior temperature. For example, the climate control system may include one or more fans, heating elements, and/or chillers configured to increase and/or decrease a temperature of the product cavity or one or more of the compartments therein. The container control circuit may cooperate with the climate control system to maintain a suitable temperature in the product cavity or one or more of the compartments therein. For example, suitable temperatures may include ambient temperature, refrigerated temperature, deep fridge temperature, and the like. In some approaches, the suitable temperature(s) may be selected or otherwise programmed by the customer. In other approaches, the suitable temperature(s) may be transmitted by the system controller and received by the container control circuit based on the particular products ordered. In some approaches, the container control circuit may be configured to maintain different temperatures in each of the multiple compartments of the product cavity.

In some approaches, the container control circuit may receive signals from one or more sensors and/or cameras operably coupled to the container control circuit and configured to detect a presence of, or otherwise identify, a particular product and determine a level or amount of the product in the product cavity. The sensors can include substantially any relevant sensor, including, for example, weight sensors, volume sensors, optical sensors, and other such sensors. In some scenarios, a customer may store their ordered consumable products in the storage container inside their house. When the container control circuit receives a signal from the sensor(s) and/or camera(s) indicating that a particular product is below a first predetermined count threshold, the container control circuit is configured to automatically re-purchase an amount of the product. For example, the container control circuit can transmit a purchase order to the inventory system and/or the system controller to purchase an amount of the particular product to bring the container inventory level of the product up to a second predetermined count threshold, which is higher than the first predetermined count threshold.

Further, the circuits, circuitry, systems, devices, processes, methods, techniques, functionality, services, servers, sources and the like described herein may be utilized, implemented and/or run on many different types of devices and/or systems. FIG. 6 illustrates an exemplary system 600 that may be used for implementing any of the components, circuits, circuitry, systems, functionality, databases, apparatuses, processes, or devices of system 100 for product ordering and securely delivering ordered products, the storage container 110, the container control circuit 130, the memory 132, the locking mechanism 115, the user interface 116, the wireless communication device 117, the sensor(s) 118, the battery 121, the inventory system 160, the system controller 170, the delivery agent's mobile device 180, the customer's mobile device 190, and/or other above or below mentioned systems or devices, or parts of such circuits, circuitry, functionality, systems, apparatuses, processes, or devices. However, the use of the system 600 or any portion thereof is certainly not required.

By way of example, the system 600 may comprise a control circuit or processor module 612, memory 614, and one or more communication links, paths, buses or the like 618. Some embodiments may include one or more user interfaces 616, and/or one or more internal and/or external power sources or supplies 640. The control circuit 612 (which may form all or part of container control circuit 130 and/or system controller 170) can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 612 can be part of control circuitry, which may be implemented through one or more processors with access to one or more memory 614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 600 may be used to implement one or more of the above or below, or parts of, components, circuits, systems, processes and the like.

The user interface 616 can allow a user to interact with the system 600 and receive information through the system. In some instances, the user interface 616 may include a display 622 and/or one or more user inputs 624, such as buttons, touch screen, track ball, keyboard, mouse, etc., which can be part of or wired or wirelessly coupled with the system 600. Typically, the system 600 further includes one or more communication interfaces, ports, transceivers 620 and the like allowing the system 600 to communicate over a communication bus, a distributed computer and/or communication network 10 (e.g., a local area network (LAN), the Internet, wide area network (WAN), etc.), communication link 618, other networks or communication channels with other devices and/or other such communications or combination of two or more of such communication methods. Further the transceiver 620 can be configured for wired, wireless, optical, fiber optical cable, satellite, or other such communication configurations or combinations of two or more of such communications. Some embodiments include one or more input/output (I/O) ports 634 that allow one or more devices to couple with the system 600. The I/O ports can be substantially any relevant port or combinations of ports, such as but not limited to USB, Ethernet, or other such ports. The I/O interface 634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 626 to provide information to the system and/or sensor information that is communicated to another component, such as the container control circuit 130, the system controller 170, etc. The sensors can include substantially any relevant sensor, such as distance measurement sensors (e.g., optical units, sound/ultrasound units, etc.), optical based scanning sensors to sense and read optical patterns (e.g., bar codes), weight sensors, volume sensors, optical sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 600 comprises an example of a control and/or processor-based system with the control circuit 612. Again, the control circuit 612 can be implemented through one or more processors, controllers, central processing units, logic, software and the like. Further, in some implementations the control circuit 612 may provide multiprocessor functionality.

The memory 614, which can be accessed by the control circuit 612, typically includes one or more processor readable and/or computer readable media accessed by at least the control circuit 612, and can include volatile and/or nonvolatile media, such as RAM, ROM, EEPROM, flash memory and/or other memory technology. Further, the memory 614 is shown as internal to the control system 610; however, the memory 614 can be internal, external or a combination of internal and external memory. Similarly, some or all of the memory 614 can be internal, external or a combination of internal and external memory of the control circuit 612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 10. The memory 614 can store code, software, executables, scripts, data, content, lists, programming, programs, log or history data, user information, customer information, product information, and the like. While FIG. 6 illustrates the various components being coupled together via a bus, it is understood that the various components may actually be coupled to the control circuit and/or one or more other components directly.

In some embodiments, systems for product ordering and securely delivering ordered products. and corresponding methods performed by the systems, are provided. A system for product ordering and securely delivering ordered products, in some embodiments, comprises: an inventory system associated with a retailer; a system controller communicatively coupled to the inventory system; and a storage container comprising: a housing enclosing a product cavity; a locking door configured to open to enable access to the product cavity; a user interface coupled to the housing; a wireless communication device; and a container control circuit communicatively coupled to the system controller and the inventory system via the wireless communication device, the container control circuit configured to: receive, via the user interface, an electronic purchase order for at least one product from the retailer; transmit to the inventory system the electronic purchase order for the at least one product from the retailer; receive from the system controller a signal instructing the container control circuit to unlock the door, the signal being transmitted after the system controller receives and authorizes a request from an electronic device associated with a delivery agent to unlock the door; and perform an electronic unlocking function causing the door to unlock, thereby allowing the delivery agent to place in the product cavity the at least one product from the retailer.

Some embodiments provide methods of product ordering and securely delivering ordered products, the methods comprising: providing a storage container comprising: a housing enclosing a product cavity; a locking door configured to open to enable access to the product cavity; a user interface coupled to the housing; a wireless communication device; and a container control circuit; receiving, via the user interface of the storage container, an electronic purchase order for at least one product from a retailer; wirelessly transmitting, using the container control circuit, the electronic purchase order for the at least one product to an inventory system; receiving and authorizing, using a system controller, a request from an electronic device associated with a delivery agent to unlock the door; using the system controller, instructing the container control circuit to unlock the door; and performing an electronic unlocking function, using the container control circuit, causing the door to unlock, thereby allowing the delivery agent to place in the product cavity the at least one product from the retailer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for product ordering and securely delivering ordered products, the system comprising:
    an inventory system associated with a retailer;
    a system controller communicatively coupled to the inventory system; and
    a storage container removably secured at a location, the storage container comprising:
        a housing enclosing a product cavity;
        a locking door configured to open to enable access to the product cavity;
        a user interface coupled to the housing, wherein the user interface is configured to receive an electronic purchase order and the electronic purchase order is input by a user physically interacting with the user interface;
        a wireless communication device; and
        a container control circuit communicatively coupled to the system controller and the inventory system via the wireless communication device, the container control circuit configured to:
            receive from the user, via the user interface, an electronic purchase order for at least one product from the retailer and location information identifying the location of the storage container;
            receive, from an application executing on a portable electronic device operated by a customer, a signal permitting the use of the storage container to electronically purchase products from the retailer;
            transmit to the inventory system the electronic purchase order for the at least one product from the retailer and the location information identifying the location of the storage container for delivery of the at least one product;
            receive from the system controller a signal instructing the container control circuit to unlock the door, the signal being transmitted after the system controller receives and authorizes a request from an application executing on an electronic device operated by a delivery agent to unlock the door; and
            perform an electronic unlocking function causing the door to unlock, thereby allowing the delivery agent to place in the product cavity the at least one product from the retailer, wherein after transmitting the electronic purchase order to the inventory system, the container control circuit receives another signal preventing the use of the storage container to electronically purchase products from the retailer.

2. The system of claim 1, wherein the container control circuit is further configured to cause the door to automatically lock upon closing of the door following delivery.

3. The system of claim 1, wherein the storage container further comprises a flexible strap configured to couple the storage container to a door of a residence.

4. The system of claim 1, wherein the storage container further comprises a rechargeable on-board power source.

5. The system of claim 1, further comprising one or more sensors configured to detect a presence and an amount of the at least one product from the retailer in the product cavity following delivery.

6. The system of claim 5, wherein the container control circuit is further configured to automatically re-purchase the at least one product when its level in the product cavity following delivery falls below a predetermined threshold.

7. The system of claim 1, wherein the product cavity comprises two compartments configured to maintain different temperatures.

8. The system of claim 1, wherein the container control circuit uses machine learning to predict items for purchase and to display the predicted items via the user interface.

9. A method for product ordering and securely delivering ordered products, the method comprising:
    providing a storage container removably secured at a location, the storage container comprising:
        a housing enclosing a product cavity;
        a locking door configured to open to enable access to the product cavity;
        a user interface coupled to the housing, wherein the user interface is configured to receive an electronic purchase order, the electronic purchase order being input by a user physically interacting with the user interface;
        a wireless communication device; and
        a container control circuit;
    receiving from the user, via the user interface of the storage container, an electronic purchase order for at least one product from a retailer and location information identifying the location of the storage container;
    receive, from an application executing on a portable electronic device operated by a customer, a signal permitting the use of the storage container to electronically purchase products from the retailer;
    wirelessly transmitting to an inventory system, using the container control circuit, the electronic purchase order for the at least one product and the location information identifying the location of the storage container for delivery of the at least one product;
    receiving and authorizing, using a system controller, a request from an application executing on an electronic device operated by a delivery agent to unlock the door;
    using the system controller, instructing the container control circuit to unlock the door; and performing an electronic unlocking function, using the container control circuit, causing the door to unlock, thereby allowing the delivery agent to place in the product cavity the at least one product from the retailer, wherein after transmitting the electronic purchase order to the inventory system, the container control circuit receives another signal preventing the use of the storage container to electronically purchase products from the retailer.

10. The method of claim 9, wherein the container control circuit is configured to cause the door to automatically lock upon closing of the door following delivery.

11. The method of claim 9, wherein the storage container further comprises a flexible strap configured to couple the storage container to a door of a residence.

12. The method of claim 9, wherein the storage container further comprises a rechargeable on-board power source.

13. The method of claim 9, wherein the storage container further comprises one or more sensors configured to detect a presence and an amount of the at least one product from the retailer in the product cavity following delivery.

14. The method of claim 13, wherein the container control circuit automatically re-purchases the at least one product when its level in the product cavity following delivery falls below a predetermined threshold.

15. The method of claim 9, wherein the product cavity comprises two compartments configured to maintain different temperatures.

16. The method of claim 9, wherein the container control circuit uses machine learning to predict items for purchase and to display the predicted items via the user interface.

\* \* \* \* \*